(12) United States Patent
Hoogland

(10) Patent No.: US 6,837,358 B1
(45) Date of Patent: Jan. 4, 2005

(54) DEVICE FOR STORAGE AND CONVEYANCE OF BULKY HOLDERS

(75) Inventor: Hendricus Antonius Hoogland, Krommenie (NL)

(73) Assignee: Fountain Patents B.V.I.O., Ijssel (NL)

( * ) Notice: Subject to any disclaimer, the term of this patent is extended or adjusted under 35 U.S.C. 154(b) by 0 days.

(21) Appl. No.: 10/031,850

(22) PCT Filed: Jul. 21, 2000

(86) PCT No.: PCT/NL00/00518

§ 371 (c)(1),
(2), (4) Date: May 3, 2002

(87) PCT Pub. No.: WO01/07345

PCT Pub. Date: Feb. 1, 2001

(30) Foreign Application Priority Data

Jul. 23, 1999 (NL) .............................................. 1012682

(51) Int. Cl.[7] ........................ B65G 25/00; B65G 29/00; B65G 37/00; B65G 47/84
(52) U.S. Cl. ................................ 198/346.2; 198/465.2; 198/465.3
(58) Field of Search .................... 198/346.2, 370.01, 198/370.03, 465.1, 465.2, 465.3

(56) References Cited

U.S. PATENT DOCUMENTS

| | | | |
|---|---|---|---|
| 3,662,905 A | * 5/1972 | Mizuno et al. | ............ 414/237 |
| 3,749,268 A | 7/1973 | Macomber et al. | |
| 3,809,208 A | * 5/1974 | Shields | .................... 198/465.2 |
| 4,658,947 A | * 4/1987 | Welder | .................... 198/346.2 |
| 5,123,517 A | 6/1992 | Windau | |
| 5,882,164 A | 3/1999 | Rapeli et al. | |
| 6,059,229 A | * 5/2000 | Luria | ..................... 198/465.1 |

* cited by examiner

Primary Examiner—Gene O. Crawford
(74) Attorney, Agent, or Firm—Hoffman & Baron, LLP

(57) ABSTRACT

The invention relates to a device for storage and conveyance of bulky holders (C), comprising at least one tier (32), each tier comprising at least one conveyance circuit (2) for the holders (C), and each conveyance circuit (2) comprising at least two longitudinal paths (4, 6) disposed substantially parallel to each other, for conveyance of the holders (C) in the direction of the longitudinal paths (4, 6), which longitudinal paths (4, 6) each define a first predetermined number (N) of adjoining holder positions for the holders (C) while two adjacent longitudinal paths (4, 6) of a conveyance circuit (2) slope from the same end in opposite directions, and in which transverse tracks situated at the opposite ends of the longitudinal paths and movable at least in the vertical direction are also provided, for conveyance of the holders (C) in the direction of the transverse tracks, which transverse tracks can transfer the holders (C) to and from the longitudinal paths (4, 6), and also comprising a second predetermined number ($M \leq 2*N-1$) of carriers (14) which are movable along the longitudinal paths and transverse tracks and are designed to take one or more holders (C), lifting means (34) being provided for moving the transverse tracks in the vertical direction.

34 Claims, 5 Drawing Sheets

| E | $C_8$ | $C_7$ | $C_6$ | $C_5$ | $C_4$ | $C_3$ | $C_2$ |
|---|---|---|---|---|---|---|---|
| $C_9$ | $C_{10}$ | $C_{11}$ | $C_{12}$ | $C_{13}$ | $C_{14}$ | $C_{15}$ | $C_1$ |

Fig 1c

| $C_8$ | $C_7$ | $C_6$ | $C_5$ | $C_4$ | $C_3$ | $C_2$ | E |
|---|---|---|---|---|---|---|---|
| $C_9$ | $C_{10}$ | $C_{11}$ | $C_{12}$ | $C_{13}$ | $C_{14}$ | $C_{15}$ | $C_1$ |

Fig 1d

DEVICE FOR STORAGE AND CONVEYANCE OF BULKY HOLDERS

This application is the U.S. National Phase of International Application Number PCT/NL00/00518, filed Jul. 21, 2000, which is incorporated herein by reference.

BACKGROUND OF THE INVENTION

The present invention relates to a device for storage and conveyance of bulky holders, in particular containers.

Container terminals are generally known and are used for the temporary storage and subsequent distribution of containers, which are brought into a seaport in large numbers in, for example, container ships, and are then transported further by rail in goods trains, by road in lorries or on waterways in smaller vessels. In order to permit temporary storage of the large quantity of containers, said containers are stacked on top of one another in rows spaced apart in a storage yard, generally with the aid of mobile gantry cranes operated by crane drivers. The free space between the rows is necessary for the tracks along which the mobile cranes can move. When a particular container from such a stack has to be transported further, the containers stacked on top of this particular container first have to be moved to a free position before the particular container can be removed from the stack and delivered for further distribution to a generally centrally situated discharge point. Such movements take a relatively large amount of time. Moreover, it is found in practice that a container, once stored, is often moved about ten times before it is removed from the storage site. However, each movement usually has to be paid for, which incurs additional costs. Furthermore, the space is being used inefficiently, since aisles are needed between the rows for the gantry cranes.

The same problem occurs in distribution centres, where pallets or other holders filled with goods are stored temporarily on racks comprising several levels. Here again, aisles have to be present between the racks and at their ends, for forklift trucks or the like which supply and remove the pallets. A large amount of floor space is therefore needed. However, the pallets are not stacked directly on top of one another and can therefore be removed individually from the racks.

A solution known from the trade is described in, for example, WO 94/06708, which discloses a storage system for bulky holders, in particular containers used in aircraft. This system consists of a number of storage levels, each consisting of mutually parallel, individually operable endless horizontal longitudinal conveyors with storage bays for the stored holders. On each level, provision is made for (endless) transverse conveyors at least at the two ends of the horizontal longitudinal conveyors. Aisles between the horizontal longitudinal conveyors are therefore not required.

A disadvantage of such a system is that separate drives, such as chain drives, are needed for each conveyor, as are separate intermediate parts, for example roller conveyors, for transferring a container from a longitudinal conveyor to a transverse conveyor.

EP-A-0 145 871 also discloses a device for the storage and conveyance of containers, in which a so-called "Doppelfahrwagen" (double carriage), which can travel along a network of rails provided with crossover points, is used. Such a carriage is provided with a first travelling mechanism comprising several sets of first travelling wheels, for movement in a first direction, and with a second travelling mechanism comprising several sets of second travelling wheels, for movement in another direction, generally transversely to the first direction, the travelling mechanisms being adjustable in height relative to each other, so that when the first travelling mechanism is resting on the rails and the second has been retracted the carriage with load can move in the first direction, and vice versa. The change in direction of movement can be made at the crossover points. This means that turntables, bends and the like in the network are not needed. These carriages known from EP-A 0 145 871 are provided with a lifting table, so that no additional aids, such as cranes and the like, are needed for loading and unloading.

Disadvantages of this known system are that drives are needed for moving the carriages, and that each carriage has to be provided with a double travelling mechanism.

SUMMARY OF THE INVENTION

The object of the present invention is to reduce the abovementioned problems, in particular to limit the number of drives and in doing so to keep the construction relatively simple, while the possibility of automation and also efficient utilization of space are retained.

To that end, the present invention provides a device for storage and conveyance of bulky holders, comprising at least one tier, each tier comprising at least one conveyance circuit for the holders, and each conveyance circuit comprising at least two longitudinal paths disposed substantially parallel to each other, for conveyance of the holders in the direction of the longitudinal paths, which longitudinal paths each define a first predetermined number (N) of adjoining holder positions for the holders, while two adjacent longitudinal paths of a conveyance circuit slope from the same end in opposite directions, and also comprising transverse tracks situated at the opposite ends of the longitudinal paths and movable at least in the vertical direction, for conveyance of the holders in the direction of the transverse tracks, which transverse tracks can transfer the holders to and from the longitudinal paths, and also comprising a second predetermined maximum number ($M \leq 2*N-1$) of carriers which are movable along the longitudinal paths and transverse tracks and are designed to take one or more holders, lifting means being provided for moving the transverse tracks in the vertical direction.

The device according to the invention comprises at least one tier, and preferably several tiers, situated above one another on a suitable frame of, for example, concrete columns with cross beams. Holders such as pallets or containers can be stored and conveyed on each tier. For this purpose, a conveyance circuit is provided on each tier, along which the stored holders can be conveyed one behind the other with the aid of the movable carriers, substantially under the influence of gravity. Each conveyance circuit comprises at least two, and preferably also two, longitudinal paths which run parallel to each other, but slope from one end in opposite directions. Transverse tracks which are movable in the vertical direction form connecting routes for the holders at the ends of the longitudinal paths, so that the whole system forms a closed circuit. The device is further provided with carriers which are movable along the longitudinal paths and transverse tracks. The length of a longitudinal path is such that a predetermined number (N) of carriers with holders fit on it. The total number of carriers (M) is then less than or equal to $2*N-1$, so that a free position in the conveyance circuit is present in each case. This makes movement possible. Since the longitudinal paths are disposed in a sloping manner, an angle of inclination of 0.20 being sufficient for 8 standard 40-foot containers disposed crosswise, the containers disposed upon the carriers, as a result of gravity, have the tendency to move by themselves towards the lowest point, so that additional drives are not needed. In order to transfer a carrier situated at one end of a longitudinal path to an adjoining longitudinal path, the transverse tracks forming the transverse connection at the ends of the longitudinal paths are movable in the vertical direction, so that the carrier is temporarily lifted up from a longitudinal path and is moved along the transverse tracks, preferably again under the influence of gravity, if the transverse tracks are provided with a suitable angle of inclination. Thereafter, the carrier is allowed to rest upon the adjoining longitudinal path again, so that further movement along the latter is possible. The lifting means, for example hydraulic piston/cylinder assemblies, are provided for this vertical movement, which is accompanied by a slight tilt if necessary.

The operation of the device is relatively simple. A tier with 2*N positions for holders and 2*N-1 carriers is filled with holders, in principle one on each carrier. However, the carriers may be arranged in such a way that several holders with smaller dimensions fit on them. When a certain holder has to be transported further from there, the circuit in question is put into operation, the carriers being allowed to circulate until the holder in question is situated at a discharge point of a longitudinal path, where said holder can be removed from the circuit. The holder is lifted off a carrier using suitable means, for example a forklift truck. A new holder can be placed on the empty carrier and stored in this way.

The carriers are advantageously mobile along the longitudinal paths, and to that end comprise rows of wheels which are spaced apart and are rotatable in the longitudinal direction of the longitudinal paths. Although in principle a limited number of wheels (e.g. 4) will suffice, it is preferable to use a large number of relatively small wheels, so that if one wheel becomes defective, the entire system does not come to a standstill. The wheels may be disposed on a common axle or otherwise.

The end sections of the longitudinal paths preferably comprise guides for the wheels, which guides are spaced apart, for example guides with an L-profile or an inverted T-profile, such as rails, or guides in the form of a channel (inverted U-profile), the space between the guides being at least partially open, for a reason to be described in further detail.

The transverse tracks are advantageously composed of rotatable discs or wheels which are disposed one after the other in rows and are rotatable about a horizontal shaft and in the longitudinal direction of the transverse tracks or wheels, along which the carriers are movable in the longitudinal direction of the transverse tracks. According to a further embodiment, each disc is mounted on the head of a piston/cylinder assembly, which piston/cylinder assemblies form the lifting means for the transverse tracks and are movable from the bottom vertically upwards into the open spaces between the guides of the end positions of the longitudinal paths. It will be understood that the, stroke of the piston/cylinder assemblies disposed at the end of the longitudinal paths, where the latter have the greatest mutual height difference, must be greater than that of the piston/cylinder assemblies at the other end. In order to ensure that a carrier can roll correctly over the discs, guides such as inverted U-profiles are advantageously provided between the rows of wheels on the underside of the carrier, for accommodating and guiding the rotatable discs, which guides extend in the transverse direction of the carrier.

Since the carriers are positioned in a virtually horizontal position by means of the transverse tracks, before the carriers can be transferred from one longitudinal path by way of the transverse tracks to an adjoining longitudinal path, blocking means are advantageously provided in the longitudinal paths, in particular for the carriers in the penultimate positions, so that sufficient distance is present between the holders on the last (lowest) carrier and penultimate carrier to allow the horizontal positioning. Blocks which can be lowered in the surface are an example of such blocking means, which are actuated, for example, when sensors detect the presence of a carrier in the last position. Spacers between the carriers can produce the same effect, but lead to an overall lengthening and widening of the conveyance circuit with the same number of carriers.

The device according to the invention advantageously has for each conveyance circuit a supply point for supplying new holders when an empty carrier is present, and a removal point for removing a stored holder. These points are advantageously situated at the same ends of the longitudinal paths, in other words, at the head end, so that the holders can be supplied and removed there using one and the same aid, such as a forklift truck. The supply point and removal point of a conveyance circuit are advantageously, situated at the ends of the longitudinal paths, where the height difference is minimal.

For an automated device according to the invention, detection points are advantageously present both at the supply point and at the removal point, for detection and identification of the holders. The detection system in question, for example a camera identification system, is dependent upon the type of coding present, on the holders. When a new holder is fed into a conveyance circuit, the data of the holder are detected and stored in a computer, together with the data of the conveyance circuit concerned. The computer forms part of the control system of the device. When a particular holder has to be removed from storage, the circuit concerned is put into operation, until through circulation the presence of this particular holder is detected at the removal point.

Several adjoining conveyance circuits, each consisting of two longitudinal paths, are advantageously present for each tier.

The device can also be provided with a further conveyor, which moves along each supply and removal point of a conveyance circuit, and on which lifting means for conveying, supplying and removing the holders are disposed in a movable manner.

The invention also relates to a container terminal provided with a device according to the invention.

BRIEF DESCRIPTION OF THE DRAWINGS

The device according to the invention is explained below with reference to the appended drawing, in which:

FIGS. 1a–1e show diagrammatically in a view from above the circulation of holders in a conveyance circuit according to the invention;

FIG. 2 shows a diagrammatic side view of the conveyance circuit according to FIG. 1a;

DETAILED DESCRIPTION OF THE PREFERRED EMBODIMENTS

Figures 1A, 1B:
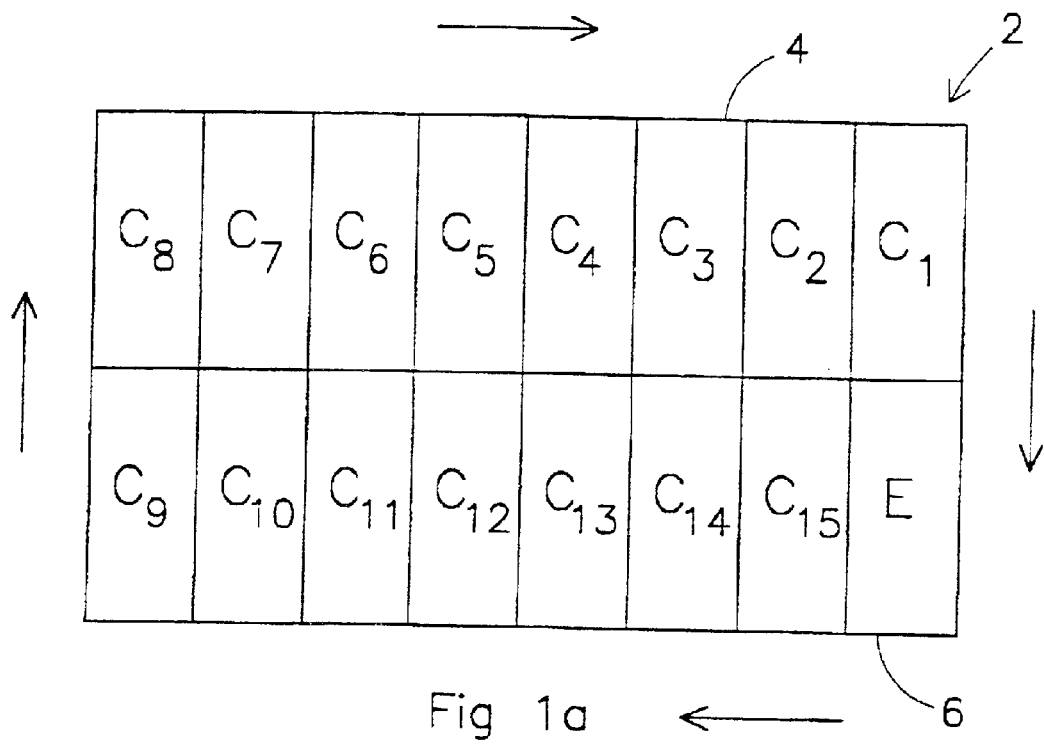
Figures 1E, 2:
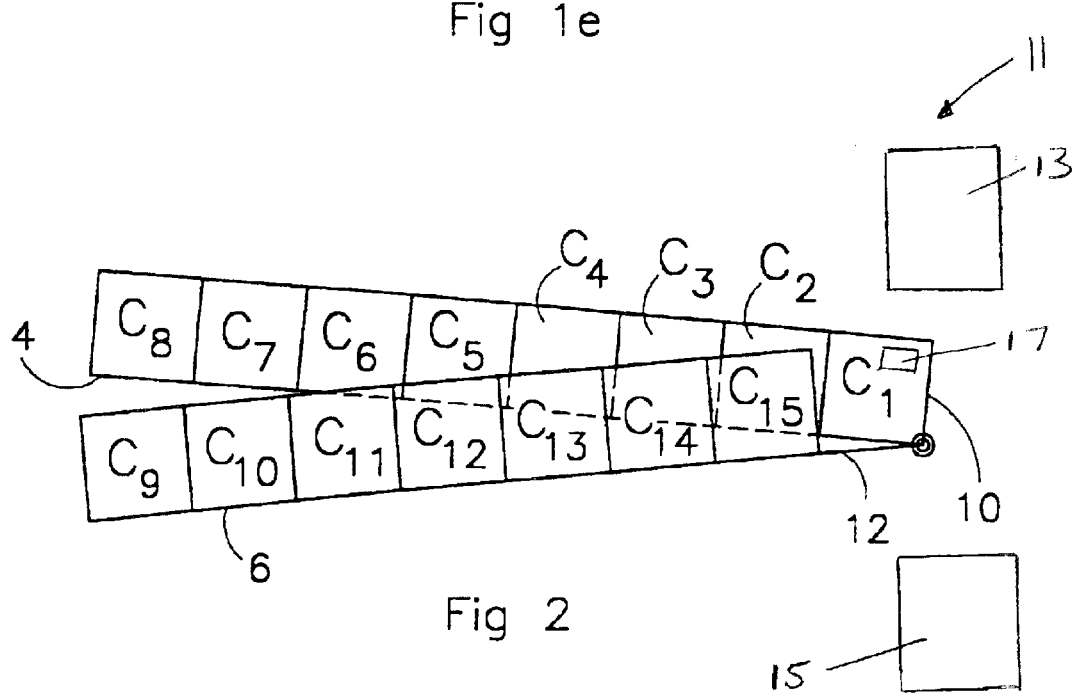

FIGS. 1a to 1e show diagrammatically in top view the circulation route of containers $C_m$, E representing an empty position. The direction of circulation is indicated by arrows. A conveyance circuit is indicated by reference numeral 2, said conveyance circuit consisting of a longitudinal path 4 and a longitudinal path 6, which is disposed parallel to and adjoining longitudinal path 4. See FIG. 2, which is a diagrammatic side view of the situation shown in FIG. 1a. The longitudinal paths 4 and 6 have opposite angles of inclination of approximately 0.2°, which is greatly exaggerated in this figure for the sake of clarity. For the sake of simplicity, transverse tracks are not shown in these FIGS. 1 and 2. In the situation shown, each longitudinal path has eight positions for carriers with containers. The longitudinal path 4 is filled with carriers with containers $C_1$–$C_8$, while the longitudinal path 6 comprises containers $C_9$–$C_{15}$ and also has an empty position E that corresponds to the top end position of the longitudinal path 6. The carrier with container $C_1$ can be moved in a manner to be described in greater detail from the longitudinal path 4 to the empty position E of the longitudinal path 6, so that an empty position E arises in the lowest end position of the longitudinal path 4. See FIG. 1b. By their own weight, the carriers with containers $C_2$–$C_8$ subsequently each drop one position, as shown in FIG. 1c, so that the empty position E now arises at the top end of the longitudinal path 4. The carrier with container $C_9$ can be lifted up on a vertically movable transverse track until it is above the top end of the longitudinal path 4 and can subsequently be moved along the transverse track to the top position of longitudinal path 4. See FIG. 1d. The empty position E, which is now situated at the bottom end of longitudinal path 6, will be filled by the series of containers $C_{10}$–$C_1$ moving under the influence of gravity, leading to the situation shown in FIG. 1e, from which it can be seen that all containers C have moved up one position. The cycle described above will be repeated during operation of the device according to the invention for the number of times that it takes for a desired container to be situated at a removal point 10, which is preferably the position at the bottom end of the top longitudinal path 4, while a supply point 12 is preferably the position at the top end of the bottom longitudinal path 6. Referring to FIG. 2, a detection system 11 can be present at both the supply point 12 and the removal point 10 for detection identification of the holders. The detection system 11 can include a first camera 13 positioned at the supply point 12 and a second camera 15 positioned at the removal point 10. The cameras 13 and 15 can detect a coding 17 on the holders.

Figure 3:
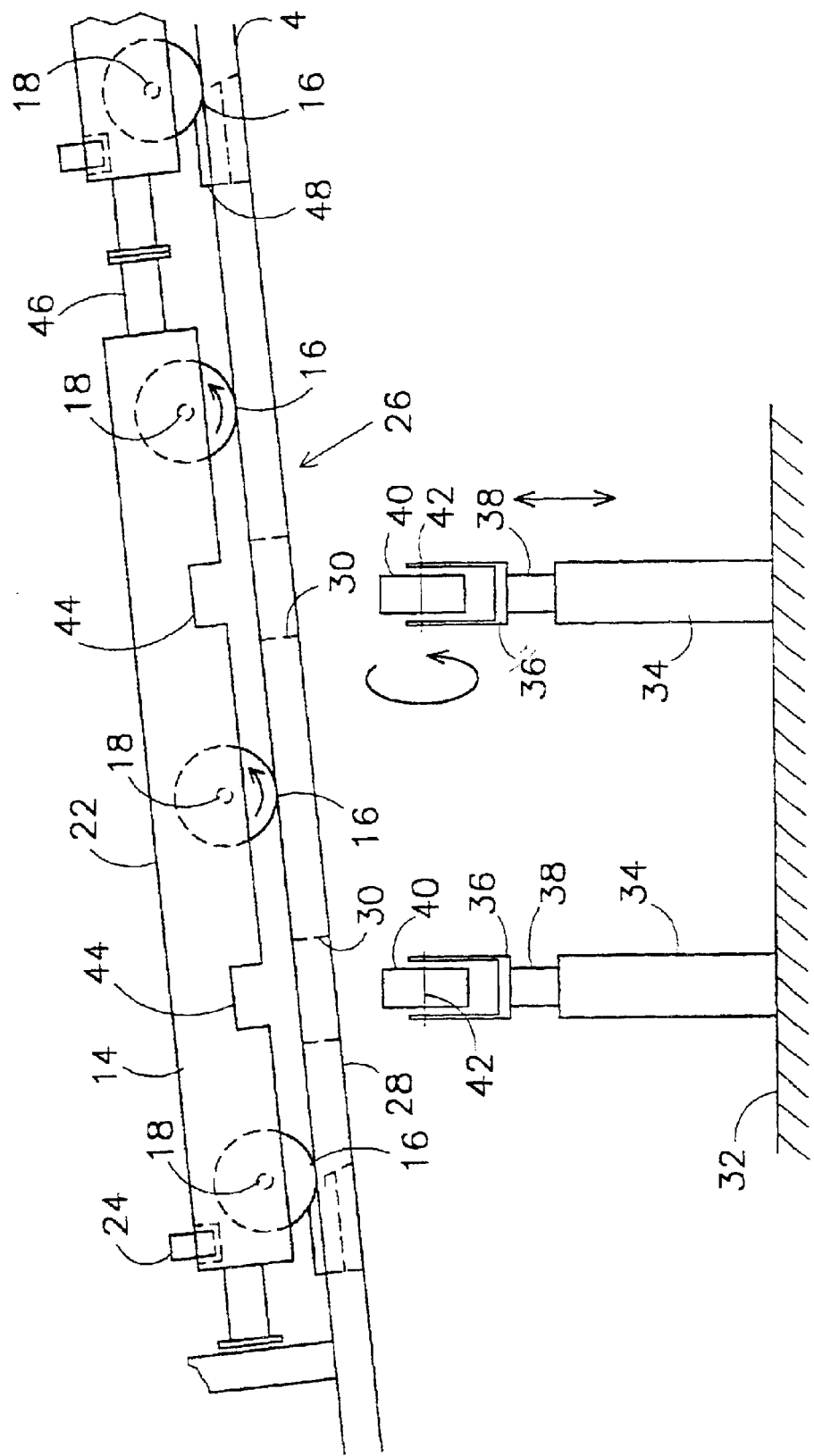
FIG. 3 shows a side view of a part of an end section of a longitudinal path of the conveyance circuit.
Figure 4:
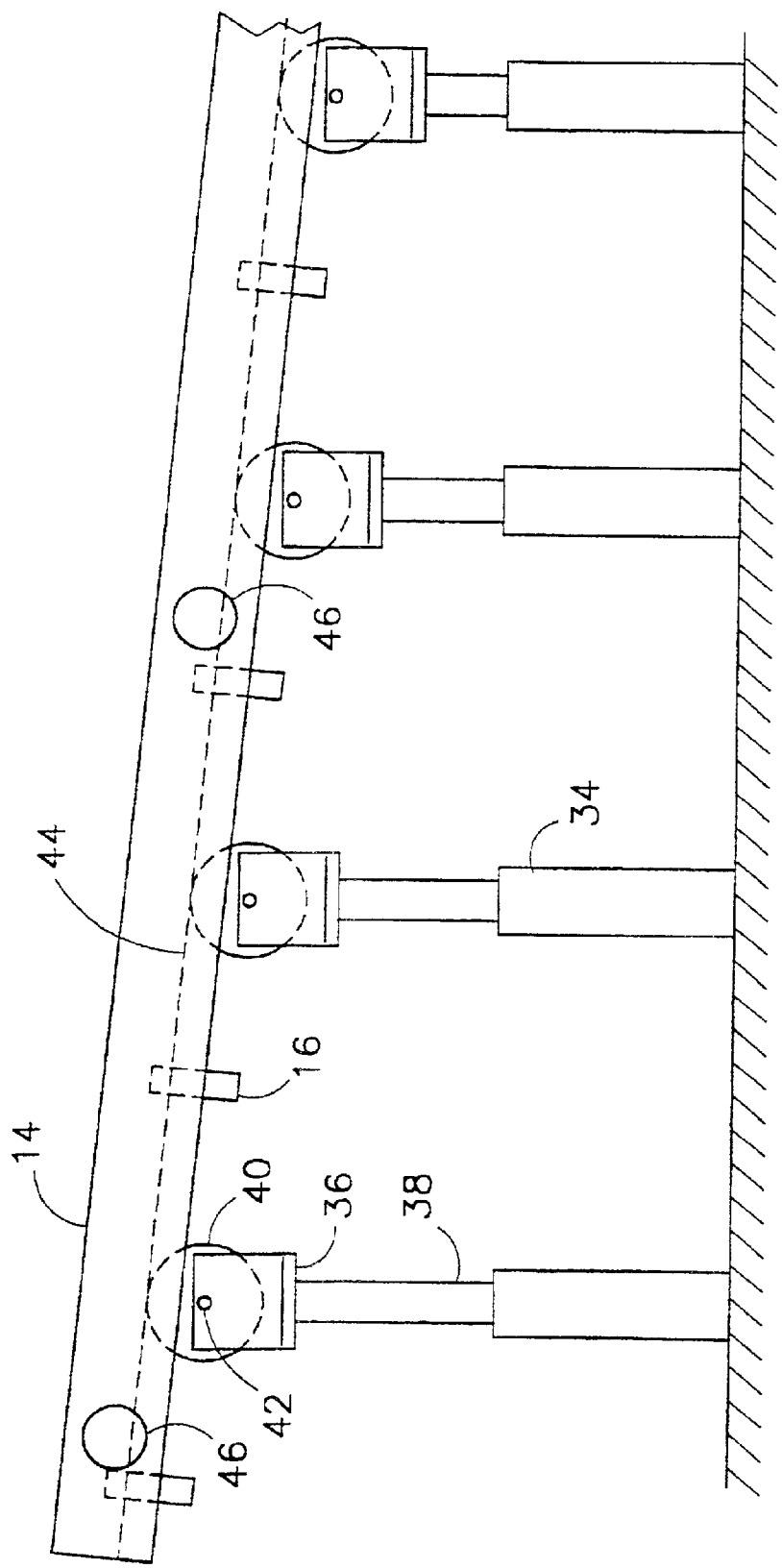
FIG. 4 shows a side view of a part of a transverse track of the conveyance circuit.

As shown in FIG. 3, each longitudinal path 4, 6 comprises a bearing structure along which a carrier 14 with container (not shown) can travel. For that purpose, the carrier 14 is provided with rows of wheels 16 which are spaced apart in the direction of travel, and of which only the outermost wheels of each row are visible in side view. The wheels 16 of a certain row can be mounted on a common horizontal axle 18, or each wheel can be provided with its own axle. The resulting mobile carrier 14 is provided with suitable means for fixing the containers, for example of the type used for fixing on lorries or rail wagons, for example pins 24 which can be recessed in the top surface 22 of the carrier 14, which pins, for the fixing, project into fitted holes of the container. An end section 26 of a longitudinal path 4, 6 comprises guides 28, running parallel, viewed in the direction of travel, the number of which corresponds to the number of wheels 16 in a row. Open spaces 30 are present between the guides 28 in the end section 26. A number of piston/cylinder assemblies 34 are disposed vertically below these open spaces 30 in the guides 28 on the tier floor 32. A rotatable disc 40 is mounted on the head 36 of each piston 38 in such a way that it can rotate about a horizontal shaft as 42, the direction of rotation of a rotatable disc 40 extending transversely to the longitudinal paths 4, 6, i.e. in the direction of movement of the transverse tracks. These rotatable discs 40 form the transverse tracks along which a carrier 14 can be moved from a longitudinal path 4 to an adjoining longitudinal path 6, and vice versa. On the underside of the carrier 14, inverted U-profiles 44 are fixed between the rows of wheels 16, which profiles extend across the entire width of a carrier 14 and ensure correct movement of the carrier 14 along the rotatable discs 40. In order to make the transverse movement possible when a carrier 14 is situated in the bottom end position of a longitudinal path, the pistons 38 are extended until the carrier 14 is no longer resting upon the guides 28, but is resting with the U-profiles 44 upon the rotatable discs 40 and is situated substantially in a horizontal position. A sloping track can be formed by subsequently operating in a controlled manner the rows of piston/cylinder assemblies disposed in the transverse direction of the transverse tracks, along which sloping track the carrier 14 will move under the influence of gravity until said carrier is situated above an end section of the adjoining longitudinal path 6, after which the carrier 14 is again taken substantially into a horizontal position by correct operation of the piston/cylinder assemblies and is subsequently placed in a position corresponding to the angle of inclination of the longitudinal path 6 and then set on the guides 28 by retraction of the pistons 38.

In order to prevent following carriers with containers from resting against the carrier 14 with container in the end position and making it impossible for the latter to be moved into a horizontal position, spacers 46 are provided at the ends of the carriers 14, and blocking means, for example blocks 48 which can be recessed in the guides 28 and block further movement of the next carrier, can also be provided. When the last position is free, the blocking means 48 are put out of action, so that the series of carriers can move up one position in the longitudinal path.

Although the above description focuses on a storage device for containers, it will be understood that the device according to the invention can also be used for other holders, for example pallets.

What is claimed is:

1. Device for storage and conveyance of bulky holders (C), comprising at least one tier (32), each tier comprising at least one conveyance circuit (2) for the holders (C), and each conveyance circuit (2) comprising at least two longitudinal paths (4,6) disposed substantially parallel to each other, for conveyance of the holders (C) in the direction of the longitudinal paths (4,6) which longitudinal paths (4,6) each define a: first predetermined number N of adjoining holder positions for the holders (C), while two adjacent longitudinal paths (4,6) of said conveyance circuit (2) slope in opposite directions at fixed angles, further comprising transverse tracks situated at the opposite ends of the longitudinal paths and movable at least in the vertical direction, for conveyance of the holders (C) in the direction of the transverse tracks, which transverse tracks can transfer the holders (C) to and from the longitudinal paths (4,6), and further comprising a second predetermined number ($M \leq 2*N-1$) of carriers (14) which are movable along the longitudinal paths and transverse tracks and are designed to take one or more holders (C), lifting means (34) being provided for moving the transverse tracks in the vertical direction.

2. Device according to claim 1, in which the carriers (14) are provided with spacers (46).

3. Device according to claim 1, in which the longitudinal paths (4, 6) are provided with blocking means (48) for retaining a carrier (14).

4. Device according to claim 1, provided with a supply point (12) and removal point (10) for feeding in and removing containers (C) respectively.

5. Device according to claim 1, in which the supply point (12) and removal point (10) are situated at the same end of the longitudinal paths (4, 6) of the device.

6. Device according to claim 1, in which the supply point (12) and removal point (10) are situated at the end of the longitudinal paths (4, 6) where the height difference between them is minimal.

7. Device according to claim 1, in which a detection system for detecting a unique code is present, which code ($C_n$) is placed on a holder (C).

8. Device according to claim 1, in which each conveyance circuit (2) comprises two parallel longitudinal paths (4, 6), and each tier (32) comprises several conveyance circuits (2) disposed next to each other.

9. Device according to claim 1, in which the second predetermined number (M) of carriers (14) movable along the longitudinal paths and transverse tracks in equal to twice the first predetermined number (N) of holder positions of a longitudinal path (4, 6) adjoining each other, minus one.

10. Device according to claim 1, wherein there are at least two conveyance circuits positioned adjacent to each other or in tiers to form a container terminal.

11. Device according to claim 1, wherein each longitudinal path slopes at an angle of approximately 0.2 degrees.

12. Device according to claim 1, in which the carriers (14) are provided with rows of wheels (16) which are spaced apart and are rotatable in the longitudinal direction of the longitudinal paths (4,6).

13. Device according to claim 12, in which at least end sections of the longitudinal paths (4,6) comprise guides (28) for guiding the wheels (16) of the carrier (14), open spaces (30) being present between the guides (28).

14. Device according to claim 1, in which the transverse tracks are formed by rotatable discs (40) which are disposed one after the other in rows and are rotatable about a horizontal shaft (42) and in the longitudinal direction of a transverse track.

15. Device according to claim 14, in which a rotatable disc (40) is fixed on the bead (36) of a piston/cylinder assembly (34).

16. Device according to claim 14, wherein an underside of a carrier (14) includes a row of wheels (16), and provided between said wheels are guides (44) for accommodating and guiding the rotatable discs (40).

17. Device for storage and conveyance of bulky holders (C), comprising at least one tier (32), each tier comprising at least one conveyance circuit (2) for the holders (C), and each conveyance circuit (2) comprising at least two longitudinal paths (4,6) disposed substantially parallel to each other, for conveyance of the holders (C) in the direction of the longitudinal paths (4,6) which longitudinal paths (4,6) each define a first predetermined number (N) of adjoining holder positions for the holders (C), while two adjacent longitudinal paths (4,6) of said conveyance circuit (2) slope in opposite longitudinal directions at fixed angles and further comprising transverse tracks situated at the opposite ends of the longitudinal paths and movable at least in the vertical direction, for conveyance of the holders (C) in the direction of the transverse tracks, which transverse tracks can transfer the holders (C) to and from the longitudinal paths (4,6), and also further comprising a second predetermined number ($M \leq 2*N-1$) of carriers (14) which are movable along the longitudinal paths and transverse tracks and are designed to take one or more holders (C), lifting means (34) being provided for moving the transverse tracks in the vertical direction.

18. Device according to claim 17, in which the carriers (14) are provided with spacers (46).

19. Device according to claim 17, in which the longitudinal paths (4, 6) are provided with blocking means (48) for retaining a carrier (14).

20. Device according to claim 17, provided with a supply point (12) and removal point (10) for feeding in and removing containers (C) respectively.

21. Device according to claim 17, in which the supply point (12) and removal point (10) are situated at the same end of the longitudinal paths (4, 6) of the device.

22. Device according to claim 17, in which the supply point (12) and removal point (10) are situated at the end of the longitudinal paths (4, 6) where the height difference between them is minimal.

23. Device according to claim 17, in which a detection system for detecting a unique code is present, which code ($C_n$) is placed on a holder (C).

24. Device according to claim 17, in which each conveyance circuit (2) comprises two parallel longitudinal paths (4, 6), and each tier (32) comprises several conveyance circuits (2) disposed next to each other.

25. Device according to claim 17, in which the second predetermined number (M) of carriers (14) movable along the longitudinal paths and transverse tracks in equal to twice the first predetermined number (N) of holder positions of a longitudinal path (4, 6) adjoining each other, minus one.

26. Device according to claim 17, wherein there are at least two conveyance circuits positioned adjacent to each other or in tiers to form a container terminal.

27. A device according to claim 17, wherein each longitudinal path slopes at an angle of approximately 0.2 degrees.

28. Device according to claim 17, in which the carriers (14) are provided with rows of wheels (16) which are spaced apart and are rotatable in the longitudinal direction of the longitudinal paths (4,6).

29. Device according to claim 28, in which at least end sections of the longitudinal paths (4,6) comprise guides (28) for guiding the wheels (16) of the carrier (14), open spaces (30) being present between the guides (28).

30. Device according to claim 17, in which the transverse tracks are formed by rotatable discs (40) which are disposed one after the other in rows and are rotatable about a horizontal shaft (42) and in the longitudinal direction of a transverse track.

31. Device according to claim 30, in which a rotatable disc (40) is fixed on the head (36) of a piston/cylinder assembly (34).

32. Device according to claim 30, wherein an underside of a carrier (14) includes a row of wheels (16), and provided between said wheels are guides (44) for accommodating and guiding the rotatable discs (40).

33. Device for storage and conveyance of bulky holders (C), comprising:
   at least one tier (32), each tier having at least one conveyance circuit (2) for the holders (C), and each conveyance circuit (2) comprising at least two longitudinal paths (4,6) disposed substantially parallel to each other, for conveyance of the holders (C) in the direction of the longitudinal paths (4,6) which longitudinal paths (4,6) each define a first predetermined number (N) of adjoining holder positions for the holders (C), while two adjacent longitudinal paths (4,6) of said conveyance circuit (2) slope from the same end in opposite directions;

transverse tracks situated at the opposite ends of the longitudinal paths and movable at least in the vertical direction, for conveyance of the holders (C) in the direction of the transverse tracks, which transverse tracks can transfer the holders (C) to and from the longitudinal paths (4,6);

a second predetermined number (M≦2*N−1) of carriers (14) which are movable along the longitudinal paths and transverse tracks and are designed to take one or more holders (C), lifting means (34) being provided for moving the transverse tracks in the vertical direction, said carriers (14) are provided with rows of wheels (16) which are spaced apart and are rotatable in the longitudinal direction of the longitudinal paths (4,6); and at least end sections of the longitudinal paths (4,6) have guides (28) for guiding the wheels (16) of the carrier (14), open spaces (30) being present between the guides (28).

34. Device for storage and conveyance of bulky holders (C), comprising:

at least one tier (32), each tier having at least one conveyance circuit (2) for the holders (C), and each conveyance circuit (2) comprising at least two longitudinal paths (4,6) disposed substantially parallel to each other, for conveyance of the holders (C) in the direction of the longitudinal paths (4,6) which longitudinal paths (4,6) each define a first predetermined number (N) of adjoining holder positions for the holders (C), while two adjacent longitudinal paths (4,6) of said conveyance circuit (2) slope from the same end in opposite directions;

transverse tracks having rotatable discs (40) which are disposed one after the other in rows and are rotatable about a horizontal shaft (42) and in the longitudinal direction of a transverse track, said transverse tracks situated at the opposite ends of the longitudinal paths and movable at least in the vertical direction, for conveyance of the holders (C) in the direction of the transverse tracks, which transverse tracks can transfer the holders (C) to and from the longitudinal paths (4,6);

a second predetermined number (M≦2*N−1) of carriers (14) which are movable along the longitudinal paths and transverse tracks and are designed to take one or more holders (C), and a lifting means (34) being provided for moving the transverse tracks in the vertical direction, wherein an underside of a carrier (14) includes a row of wheels (16), and provided between said wheels are guides (44) for accommodating and guiding the rotatable discs (40).

* * * * *

UNITED STATES PATENT AND TRADEMARK OFFICE
CERTIFICATE OF CORRECTION

PATENT NO. : 6,837,358 B1
DATED : January 4, 2005
INVENTOR(S) : Hendricus Antonius Hoogland It is certified that error appears in the above-identified patent and that said Letters Patent is hereby corrected as shown below:

Title page,
Item [74], *Attorney, Agent, or Firm,* now reads "Hoffman & Baron, LLP" and should read -- Hoffmann & Baron, LLP --.

Column 2,
Line 66, now reads "inclination of 0.20 being"; should read -- inclination of 0.2° being --.

Column 7,
Line 45, now reads "is fixed on the bead (36)"; should read -- is fixed on the head (36) --.

Signed and Sealed this

Twenty-sixth Day of April, 2005

JON W. DUDAS
*Director of the United States Patent and Trademark Office*